Patented Sept. 18, 1934

1,973,773

UNITED STATES PATENT OFFICE 1,973,773

ANTHRAQUINONE COMPOUND AND PROCESS OF PREPARING THE SAME

Melvin A. Perkins, Milwaukee, Wis., assignor to E. I. du Pont de Nemours & Company, Wilmington, Del., a corporation of Delaware No Drawing. Application March 27, 1933, Serial No. 662,999

9 Claims. (Cl. 260—58)

This invention relates to novel anthraquinone compounds and to a process of preparing the same. More particularly, this invention deals with compounds of the hitherto unknown $\beta,\beta'$-dianthraquinonyl-selenide series, which may be represented by the general formula: A—Se—A, wherein A stands for the monovalent residue of an anthraquinone. Of particular interest are the 2,2'-dianthraquinonyl selenides of the formula:

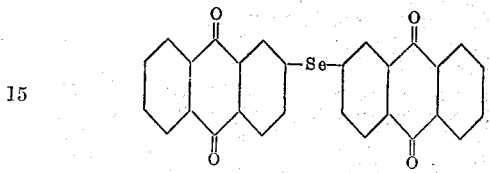

and those derivatives thereof which contain aroyl-amino substituents in an alpha position, for instance, the 5,5'- or 8,8'-dibenzoyl-diamino derivative. Other nuclearly substituted 2,2'-dianthraquinonyl-selenides also come within the scope of this invention and may be prepared by the general process herein disclosed.

This general process consists of heating a suitable 2-halogen-anthraquinone, for instance, 2-chloro- or 2-bromo-anthraquinone or a substitution derivative of these, for instance, the corresponding 5- or 8-aroyl-amino derivative, with elemental selenium in an organic solvent which has reducing properties, that is, one which is rich in hydrogen, for instance, tetralin or kerosene, preferably in the presence of an acid absorbing agent, such as soda ash or lime. The solvents mentioned are high boiling, and the reaction therefore may be carried out at atmospheric pressure, at the boiling or reflux temperature of the solvent. Low boiling solvents, however, are also suitable when used in a closed vessel, so as to allow the temperature to rise above 150° C. An excellent example of a low boiling solvent is methyl alcohol, which is generally most effective at a temperature between 175 and 225° C. If desired, a non-reducing solvent, such as trichlorobenzene, may be used, provided a small portion of a reducing solvent is admixed therewith.

It appears that the solvent takes part in this reaction, supplying hydrogen to react with the selenium to furnish hydrogen selenide in transient state. The reaction may thus be considered as proceeding along the following typical equation:

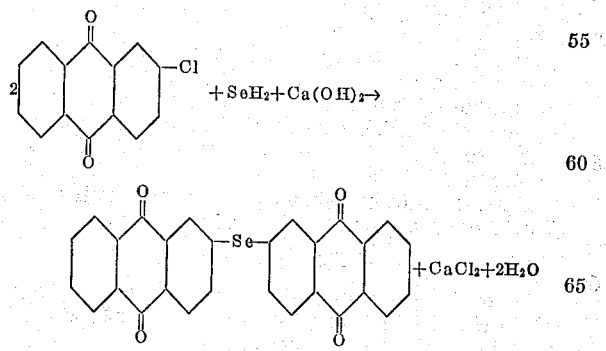

The above result was not to be foreseen, because it it known, for instance, that upon reacting 2-chloro-anthraquinone with sodium selenide in aqueous alcoholic medium, the product is not dianthraquinonyl-selenide, but the sodium salt of 2-anthraquinone-selenol (German Patent No. 264,941).

The novel products have the property of dyeing cotton by the usual vat process, and are particularly useful as dyestuffs when the anthraquinone nucleus is substituted by chromophoric groups, such as amino or aroyl-amino groups in alpha position.

Without limiting my invention to any particular procedure, the following examples, in which parts by weight are given, will serve to illustrate my preferred mode of operation.

Example 1

10 parts of tetrahydro-naphthalene are added to 110 parts of trichlorobenzene, and a mixture made up of 24.2 parts of 2-chloro-anthraquinone, 4.2 parts of selenium powder and 10 parts of anhydrous sodium acetate is gradually stirred into the mixed solvent.

The mass is heated under good agitation to 205–210° C. and maintained at this temperature for about eight hours. The mixture, which is at first very thick, dissolves readily upon heating. The end of the reaction is recognized by the fact that a small test sample of the solid formed dissolves in sulfuric acid with an intense blue color.

When the reaction is ended, the product is cooled. A thick mass of silky orange-yellow needles results. This is filtered off and washed successively with alcohol and hot water. The yield is practically theoretical. The product dissolves in sulfuric acid with a strong blue color, and gives an orange-red vat and weak yellow dyeings. After extraction with sodium sulfide solution to remove a trace of free selenium, the product is found to contain one selenium atom for two anthraquinone nuclei.

*Example 2*

36.1 parts of 1-benzoylamino-6-chloro-anthraquinone, 4.4 parts of selenium powder and 10 parts of anhydrous sodium acetate are ground together until uniform and stirred into 180 parts of tetrahydro-naphthalene at room temperature. The mass is now heated, under good agitation, to reflux and maintained at that point for about seven hours or until a test sample gives a dull greenish-blue coloration in sulfuric acid. The clear yellow melt is then allowed to cool under agitation. Solid matter separates almost at once, giving a yellowish-orange mass which becomes very thick. After diluting with an equal volume of tetrahydro-naphthalene, and cooling further to room temperature, the mass is filtered, washed well with alcohol and finally with hot water and dried. The product forms a reddish-yellow powder which dissolves in cold sulfuric acid with a greenish-blue color. It may be recrystallized from nitrobenzene as a yellow crystalline solid which corresponds in selenium content to 1,1'-dibenzoyl-diamino-6,6'-dianthraquinonyl-selenide.

It gives an orange-brown vat from which cotton is dyed a strong clear yellow shade.

*Example 3*

30 parts of 1-amino-2-bromo-anthraquinone, 4.3 parts of selenium powder, 10 parts of sodium acetate (anhydrous) and 150 parts of tetrahydro-naphthalene are mixed and heated at the boil for about eight hours. The product is isolated as in the previous examples and consists of large crystals of a dark brown color. It gives a green-yellow coloration when dissolved in sulfuric acid. Its vat possesses an intense brownish-orange color, from which cotton is dyed in weak orange-brown shades fast to soaping.

*Example 4*

27.7 parts of 2,6-dichloro-anthraquinone, 4.4 parts of selenium powder and 10.0 parts of anhydrous sodium acetate are stirred into 150 parts of tetrahydro-naphthalene and the mixture heated at the boil for about five hours. At the end of this time the mass is allowed to cool, then it is filtered and the residue washed with alcohol and water in the order named. The product does not appear to be entirely homogeneous since part of it dissolves in sulfuric acid to give a strong bluish-green coloration (selenide) while a part gives a brown coloration under the same conditions. The selenide fraction may be separated from the by-product by solvent extraction, for instance, by means of hot nitrobenzene. It gives a brownish-red alkaline hydrosulfite vat and dyes in rather weak greenish-yellow shades.

It will be understood that many variations and modifications are possible in my preferred mode of operation without departing from the spirit of this inventon.

In the clams below, it should be understood that where new products, dyestuffs, or articles of manufacture are claimed, I mean to include these bodies not only in substance, but also in whatever state they exist when applied to material dyed, printed or pigmented therewith.

I claim:

1. A compound of the anthraquinone series containing selenium, said compound containing in its formula the nuclear structure of 2,2'-dianthraquinonyl-selenide.

2. A compound of the general formula ($\beta$) A—Se—A ($\beta$), where A stands for a monovalent anthraquinone radical, while ($\beta$) indicates the position of attachment of the Se atom to the anthraquinone nucleus.

3. A compound of the general formula:

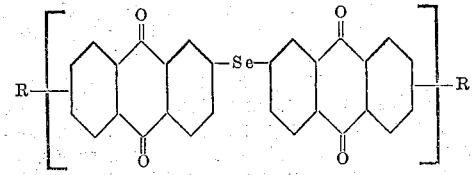

wherein R stands for H or for the group NH₂ or NH—CO—Aryl attached to an alpha position.

4. 2,2'-dianthraquinonyl-selenide.

5. 5,5'-dibenzoyl-diamino - 2,2' - dianthraquinonyl-selenide.

6. A process for producing an anthraquinone compound containing selenium which comprises reacting a beta halogen anthraquinone with selenium in an organic reducing solvent and in the presence of an acid absorbing agent.

7. A process for producing an anthraquinone compound containing selenium which comprises heating a 2-halogen-anthraquinone with selenium in an organic solvent which is rich in hydrogen and in the presence of an acid absorbing agent.

8. The process of producing 2,2'-dianthraquinonyl-selenide which comprises heating 2-halogen-anthraquinone with selenium in a solvent selected from the group consisting of kerosene and tetralin at the reflux temperature of the solvent, and in the presence of an acid absorbing agent.

9. The process of producing 5,5'-dibenzoyl-diamino-2,2' - dianthraquinonyl - selenide which comprises heating 2-halogen-5-benzoylamino-anthraquinone with selenium in a solvent selected from the group consisting of kerosene and tetralin at the reflux temperature of the solvent, and in the presence of an acid absorbing agent.

MELVIN A. PERKINS.